United States Patent
Iyer

(10) Patent No.: US 9,804,681 B2
(45) Date of Patent: Oct. 31, 2017

(54) METHOD AND SYSTEM FOR AUDIBLE DELIVERY OF NOTIFICATIONS PARTIALLY PRESENTED ON AN ALWAYS-ON DISPLAY

(71) Applicant: Motorola Mobility LLC, Chicago, IL (US)

(72) Inventor: Boby Iyer, Elmhurst, IL (US)

(73) Assignee: Motorola Mobility LLC, Chicago, IL (US)

( * ) Notice: Subject to any disclaimer, the term of this patent is extended or adjusted under 35 U.S.C. 154(b) by 188 days.

(21) Appl. No.: 14/936,735

(22) Filed: Nov. 10, 2015

(65) Prior Publication Data

US 2017/0131778 A1    May 11, 2017

(51) Int. Cl.
| | |
|---|---|
| *G06F 3/01* | (2006.01) |
| *G06F 1/16* | (2006.01) |
| *G06F 3/0346* | (2013.01) |
| *G06F 3/0481* | (2013.01) |
| *G06F 3/0488* | (2013.01) |
| *G06F 3/16* | (2006.01) |
| *G06F 21/31* | (2013.01) |
| *H04M 1/725* | (2006.01) |

(52) U.S. Cl.
CPC ............ *G06F 3/017* (2013.01); *G06F 1/1688* (2013.01); *G06F 1/1694* (2013.01); *G06F 3/0346* (2013.01); *G06F 3/04817* (2013.01); *G06F 3/04883* (2013.01); *G06F 3/165* (2013.01); *G06F 3/167* (2013.01); *G06F 21/31* (2013.01); *H04M 1/725* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 8,131,848 B1* | 3/2012 | Denise | H04M 19/04 709/224 |
| 9,692,871 B2* | 6/2017 | Ren | H04M 1/7255 |
| 2009/0164219 A1* | 6/2009 | Yeung | G04C 3/002 704/258 |
| 2010/0121636 A1* | 5/2010 | Burke | G06F 3/0346 704/233 |

* cited by examiner

*Primary Examiner* — Nicholas Lee
(74) *Attorney, Agent, or Firm* — Philip H. Burrus, IV

(57) ABSTRACT

An electronic device includes one or more processors, a touch-sensitive display and an audio output operative in a first mode to produce an audible output at a first output level, and operable in a discreet mode operative to produce the audible output at a second output level that is less than a first output level. The one or more processors can present a user actuation target or a portion of a notification at a location on the touch sensitive display. The processors can then detect an object proximately located with touch-sensitive display at the location and a lifting gesture lifting the electronic device from a first elevation to a second elevation. In response, the one or more processors can cause the audio output to deliver notification details as the audible output from an audio output device.

20 Claims, 11 Drawing Sheets

METHOD AND SYSTEM FOR AUDIBLE DELIVERY OF NOTIFICATIONS PARTIALLY PRESENTED ON AN ALWAYS-ON DISPLAY

BACKGROUND

Technical Field

This disclosure relates generally to electronic devices and corresponding methods, and more particularly user interface operations and corresponding methods in electronic devices.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking. As the technology of these devices has advanced, so too has their feature set. For example, not too long ago all electronic devices had physical keypads. Today touch sensitive displays are more frequently seen as user interface devices.

Technological advances such as the touch sensitive display offer additional flexibility. With a touch sensitive display, for instance, a user interface can change from a keypad to a music player to a gaming device in an instant. However, such technological advances do not always reduce complexity. Even with a touch sensitive display, a user desiring to read an email must first wake the device, unlock the screen, navigate to the email application, select the email, and then wait for it to be presented on the display. When the person need to check email for business or personal purposes frequently, this can be time consuming and tedious. Even when a user does not mind this additional time and effort, they are still required to look at the display to read the remainder of the email. If they are walking down the street, they run the risk of bumping into someone or something. Moreover, they may not be able to read the email if they are in bright ambient light situations such as direct sunlight. It would be advantageous to have improved user interface systems and methods that simplified access to, and consumption of, information in an electronic device.

Figure 1:
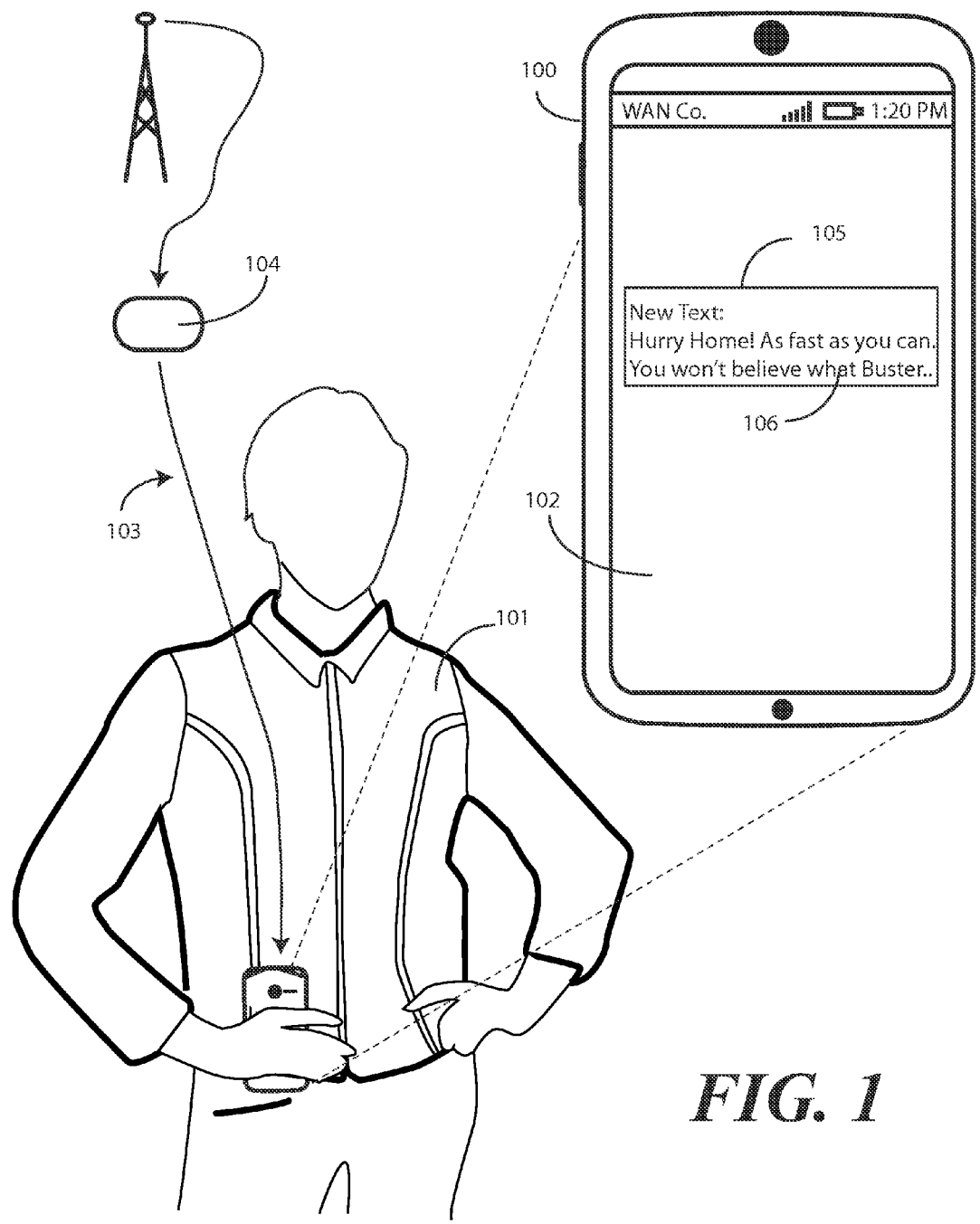
FIG. 1 illustrates a user with an electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to retrieving notification information from an electronic device as audio output in response to one or more gesture inputs. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of provisioning notification information in the form of audio output in response to gesture inputs as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the delivery of notification information as audio output in response to one or more of gesture commands or detected environmental conditions about the electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by making it simpler and faster to retrieve notification information from an electronic device and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods for retrieving information from an electronic device in response to one or more gesture inputs. In one embodiment, an electronic device includes a touch sensitive display. When a user is not actively using the device, it can be transitioned to a locked state. The user can then unlock the device in one of a variety of ways. Examples include entering a personal identification number, interacting with a biometric sensor such as placing a finger on a fingerprint sensor, and so forth.

In one or more embodiments, so that the user does not miss information when the device or display is in a locked state, the display can present a portion of a notification on the display when it is received, and where the notification is too lengthy to be presented in its entirety. For example, if a text message is received, a portion of the text message can be presented on the display, even when the display is locked. Accordingly, a user can see that the message has arrived. Additionally, the user can determine, from the portion of the message that is displayed, whom the message is from and something about its content.

With prior art devices, if the user wanted to read the remainder of the message, they had unlock the display, navigate to the messaging application, select the message, and then wait for it to be presented on the display. Embodiments of the present disclosure advantageously allow the user to retrieve the complete message with only a few simple gesture inputs, thereby avoiding the unlocking and navigation steps required in prior art devices. This saves time and simplifies the process of retrieving information from the electronic device.

In one embodiment, when a portion of a notification is presented on a display, to retrieve the entire notification, a user simply touches an icon or the notification itself and the lifts the electronic device to their ear. When this happens, an audio output of the electronic device will read the notification—as audio output from an audio output device such as a loudspeaker microphone—to the user. In one or more embodiments, a simple touch and lift is all that is required. No voice command or unlocking steps are required. In other embodiments, the user may be required to touch and hold the icon or the notification prior to lifting the device to reduce the chance of false triggering, thereby ensuring that notifications are read only when the user desires to hear them.

In one embodiment, the touch sensitive display is configured as an "always-on display." As used herein, an "always-on display" means that even when the device itself or the display is locked, information can still be presented on the display. Illustrating by example, in one embodiment an always-on display provides a small amount of information on the display whenever a user is interacting with the device, and even when the device is locked. Proximity sensors can be used, for example, to detect when a user is near, holding, or touching an electronic device. When this occurs, information can be continually presented on the display in one or more embodiments. In other embodiments, it will be selectively presented on the display. The proximity sensors can be used to detect when the device is in a pocket or otherwise situated away from the user to place the always-on display in a low power or sleep mode to conserve battery power as well.

The always-on display can be configured to present a predefined amount of information continually whenever the device detects, with proximity sensor or other components, that a user is nearby user is nearby or is interacting with the electronic device. For example, in one embodiment the predefined information can include the time of day and one or more user actuation targets. The user interaction targets can be in the form of icons in one or more embodiments. When using this type of always-on display, the user can touch a user interaction target to see portions of notifications such as email correspondence, social media activities, text messages, multimedia messages, and so forth.

For example, in one embodiment, an always-on display presents the time of day, a notification icon, and one or more other icons when the device is locked. A user can press—or alternatively press and hold to prevent false tripping—the notification icon to see a portion of a notification. In one or more embodiments, if the user wants to retrieve the remainder of the notification, the user simply raises the electronic device to their ear and the entirety of the notification is discreetly delivered as audio output through an earpiece speaker. Advantageously, the user can simply touch the icon and lift the device to hear the entirety of an email, text message, social media activity, or other notification.

Thus, in one or more embodiments, a method of operating an electronic device includes presenting, with one or more processors of the electronic device, a portion of a notification on a touch-sensitive display. The portion of the notification can be presented as it is received in one embodiment. Alternatively, the portion of the notification can be presented when a user touches—or alternatively touches and holds—a notification or other type of icon.

In one embodiment, the one or more processors then detect an object, i.e., the person's finger in this example, is proximately located with the touch-sensitive display at a location corresponding to where the icon is presented. Alternatively the one or more processors can detect that the object is proximately located with the touch sensitive display at a location where, for example, a notification icon is presented if the user is required to touch the notification icon to reveal the portion of the notification.

In one or more embodiments, when the user then lifts the electronic device to their ear, the one or more processors detect a lifting gesture lifting the electronic device from a first elevation to a second elevation, where the second elevation greater than the first elevation. In response to detecting the touch followed by the lifting gesture, in one or more embodiments the one or more processors then cause the electronic device to enter a discrete mode of operation.

The electronic device can operate in a first mode, referred to herein as the normal mode, and in a second mode, referred to herein as the discreet mode. In the normal mode of operation, which is the default mode of operation in one embodiment, the electronic device, its audio outputs, and its voice control interface engine are collectively operable to receive speech commands, through a microphone, from a first distance. They then to produce, through an audio output device such as a loudspeaker, audible output at a first output level.

The electronic device, audio outputs, and voice control interface engine can also operate in a second mode of operation, which is the discreet mode. When this occurs the voice control interface engine is operative to receive the speech command from a second distance. They also produce audible output at a second output level. In one embodiment the second distance is less than the first distance and the second output level is less than the first output level. This second mode of operation, i.e., the discreet mode, allows the user to optionally deliver voice commands with a much lower volume. Additionally, as described below, the discreet mode allows the user to receive notifications as audio output at a level that others will not overhear. For instance, when in the discreet mode of operation, the user may hear notifications as audio from an earpiece speaker rather than a loudspeaker.

In one or more embodiments, when the user then lifts the electronic device to their ear after touching a portion of a notification or an icon, the one or more processors cause the electronic device to enter a discrete mode of operation. The audio output of the electronic device is then operable to deliver, with an audio output device such as an earpiece speaker, the entirety of the content of the notification as the audible output discreetly into the user's ear.

Accordingly, in one or more embodiments when a portion of a notification is presented on a display, when the user touches the portion of the notification or an icon and raises the electronic device to their ear, the electronic device will read the notification details discreetly through the earpiece speaker with no voice command required. In one or more embodiments, this discreet delivery can be initiated by instead touching and holding the notification portion (to prevent false tripping of the feature) or the icon and raising the electronic device to their ear. Other initiation sequences will be obvious to those of ordinary skill in the art having the benefit of this disclosure.

Once the touch and lift gesture sequence is detected, it can be used to allow a user to obtain information from a variety of sources operating in the electronic device. For example, if a user touches a specific user actuation target corresponding to an application, notification details from the application can be read to the user while the electronic device is operating in the discreet mode. If a user touches a specific user actuation target used to unlock the electronic device, the user can then lift the electronic device to their head to speak their personal identification number discreetly into a microphone to unlock the device. Other applications for embodiments of the disclosure will be obvious to those of ordinary skill in the art having the benefit of this disclosure.

Turning now to FIG. 1, illustrated therein is a user 101 using an electronic device 100 configured in accordance with one or more embodiments of the disclosure. The electronic device 100 includes a touch sensitive display 102. In one embodiment, the touch sensitive display 102 is an always-on display, meaning even when the device itself or the display is locked, information can still be presented on the display. In other embodiments, such as those shown below with reference to FIG. 2, the always-on display can present a predefined amount of information continually whenever the device detects, with proximity sensor or other components, that a user is nearby user is nearby or is interacting with the electronic device 100. For example, in one embodiment the predefined information can include the time of day and one or more user actuation targets. The user interaction targets can be in the form of icons in one or more embodiments. When using this type of always-on display, the user can touch a user interaction target to see portions of notifications such as email correspondence, social media activities, text messages, multimedia messages, and so forth.

As shown in FIG. 1, the electronic device 100 receives 103 a notification 104 from a remote electronic device. Here, the notification 104 is in the form of a text message received from a network. Other examples of notifications include electronic mail, multimedia messages, social networking activities and updates, newsfeed streams, application notifications, system notifications, and so forth. Still other examples of notifications will be obvious to those of ordinary skill in the art having the benefit of this disclosure.

In one embodiment, when the notification 104 is received, a portion 105 of the notification 104 is presented on the display 102. Here, the portion 105 of the text message says, "Hurry home! As fast as you can. You won't believe what Buster . . . " The user 101 can infer many different things from this message. In one instance, her dog, Buster, may be injured and need help. However, in another instance, there may be no emergency, and the user 101 may be able to deal with whatever else Buster may be involved in at a later time. Since only a portion 105 of the text message is presented on the display 102, the only way for the user 101 to determine which instance is the actual situation is to retrieve the remainder of the content 106 of the notification 104 from the electronic device 100.

With prior art devices, if the user 101 wants to see the content 106 of the notification 104 in its entirety, she will have to unlock the electronic device 100 and view the details from a messaging application or a "notification curtain" that presents multiple notifications on a single screen. As noted above, this can be tedious and time consuming. Advantageously, as will be described below, embodiments of the present disclosure allow the user 101 to obtain the content 106 of the notification 104 in its entirety as audio output simply by touching the portion 105 of the notification 104 and lifting the electronic device 100 to her ear.

Figure 2:
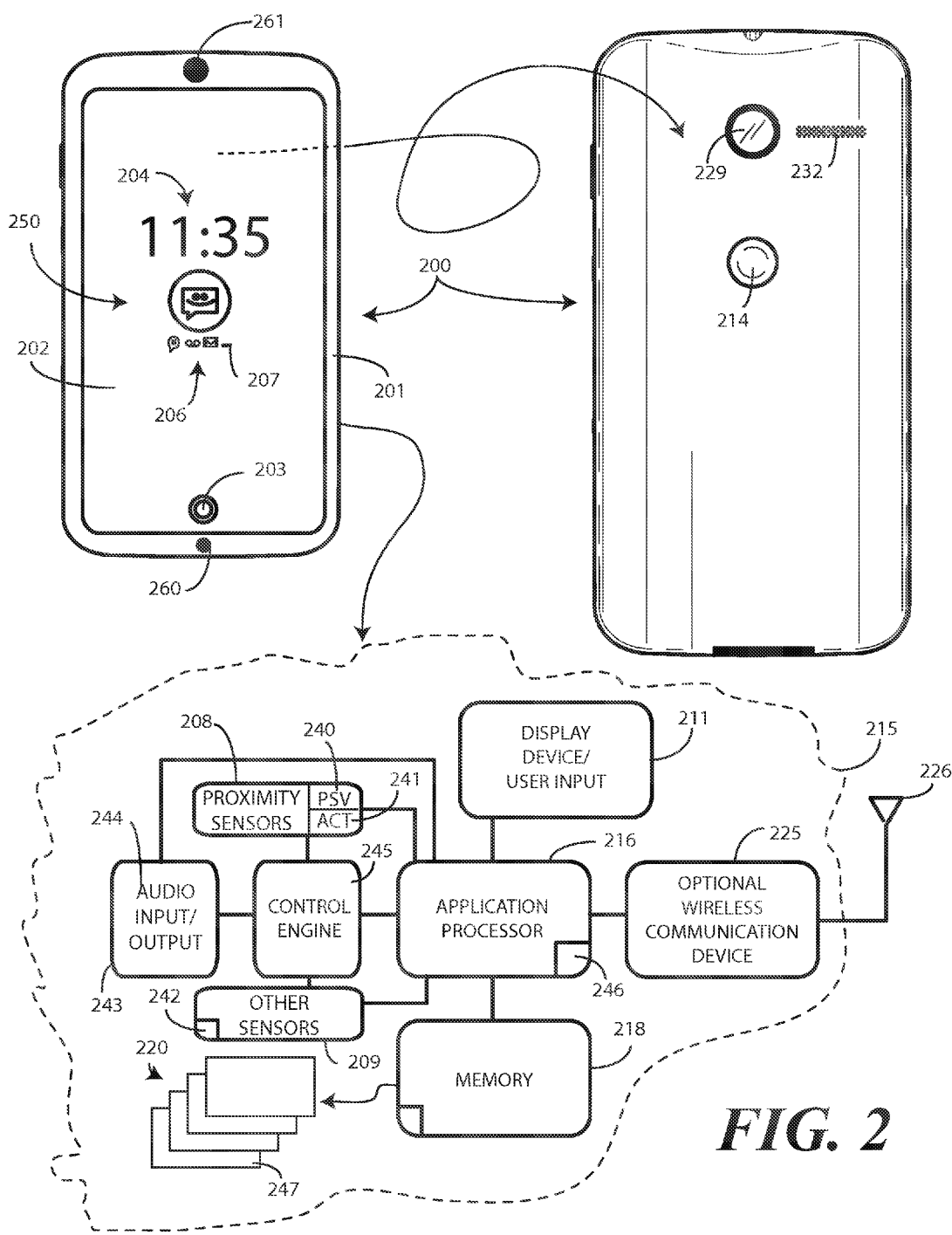
FIG. 2 illustrates a schematic block diagram of one explanatory electronic device in accordance with one or more embodiments of the disclosure.

Turning now to FIG. 2, illustrated therein illustrated therein is another explanatory electronic device 200 configured in accordance with one or more embodiments of the disclosure. The electronic device 200 of FIG. 2 is a portable electronic device, and is shown as a smart phone for illustrative purposes. However, it should be obvious to those of ordinary skill in the art having the benefit of this disclosure that other electronic devices may be substituted for the explanatory smart phone of FIG. 2. For example, the electronic device 200 could equally be a palm-top computer, a tablet computer, a gaming device, a media player, or other device.

This illustrative electronic device 200 includes a touch sensitive display 202, which serves as a primary user interface 211 of the electronic device 200. Users can deliver user input to the touch sensitive display 202 of such an embodiment by delivering touch input from a finger, stylus, or other objects disposed proximately with the display. In one embodiment, the touch sensitive display 202 is configured as an active matrix organic light emitting diode (AMOLED) display. However, it should be noted that other types of displays, including liquid crystal displays, would be obvious to those of ordinary skill in the art having the benefit of this disclosure.

In this illustrative embodiment, the touch sensitive display 202 is an always-on display configured to present a predefined amount of information 250 continually whenever the device detects, with one or more proximity sensor components 240 or other components, that a user (101) is nearby user is nearby or is interacting with the electronic device 200. In this illustrative embodiment, the predefined amount of information 250 includes the time of day 204 and one or more user actuation targets.

In one embodiment, one of the user actuation targets comprises a notification icon 205. A user (101) can interact with the notification icon 205 to obtain notification information from the electronic device 200. For example, in one embodiment a user (101) can touch the notification icon 205 and portions (105) of notifications (104) will appear on the top and/or bottom of the touch sensitive display 202. In one embodiment, the user (101) can touch, hold, and drag the notification icon 205 up to launch a notification application. In one embodiment, the user (101) can touch, hold, and drag the notification icon left or right to make notifications (104) disappear. Accordingly, the predefined amount of information 250, presented on the always-on display, is an alternative user interface for selective presentation of portions (105) of notifications (104). This is in contrast to simply presenting portions (105) of notifications (104) on the touch sensitive display (102) as was the case in FIG. 1 above. Other techniques for presenting portions (105) of notifications (104) will be obvious to those of ordinary skill in the art having the benefit of this disclosure.

In one embodiment, the predefined amount of information 250 can additionally include one or more other user actuation targets 206. The user actuation targets 206 can be configured as icons in one or more embodiments. In one embodiment, each of the other user actuation targets 206 comprises application icons. For example, as applications generate or receive notifications (104), user actuation targets 206 corresponding to those applications can appear in the predefined amount of information 250. To prevent the touch sensitive display 202 from drawing too much power, in one or more embodiments the predefined amount of information 250 is limited. Accordingly, in one embodiment when the other user actuation targets 206 become too large in number, an ellipsis icon 207 can be displayed to indicate that more notifications (104) are available from more applications.

In one or more embodiments, the predefined amount of information 250 also can include a device unlock icon 203. Where included, the user (101) can touch, hold, and drag the device unlock icon 203 to enter a personal identification number to unlock the device. Other types of icons suitable for inclusion in the predefined amount of information 250, where the predefined amount of information 250 is used with an always-on display, will be obvious to those of ordinary skill in the art having the benefit of this disclosure.

The explanatory electronic device 200 of FIG. 2 includes a housing 201. Features can be incorporated into the housing 201. Examples of such features include an optional camera 229 or an optional speaker port 232 disposed atop a loudspeaker. These features are shown being disposed on the rear major face of the electronic device 200 in this embodiment, but could be located elsewhere. In this illustrative embodiment, a user interface component, which may be a button 214 or touch sensitive surface, can also be disposed along the housing 201.

A block diagram schematic 215 of the electronic device 200 is also shown in FIG. 2. In one embodiment, the electronic device 200 includes one or more processors 216. In one embodiment, the one or more processors 216 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 200. Each of the application processor and the auxiliary processor(s) can be configured to process and execute executable software code to perform the various functions of the electronic device 200. A storage device, such as memory 218, can optionally store the executable software code used by the one or more processors 216 during operation.

In this illustrative embodiment, the electronic device 200 also includes a communication circuit 225 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 225 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 225 can include wireless communication circuitry, one of a receiver, a transmitter, or transceiver, and one or more antennas 226.

In one embodiment, the one or more processors 216 can be responsible for performing the primary functions of the electronic device 200. For example, in one embodiment the one or more processors 216 comprise one or more circuits operable with one or more user interface devices, which can include the display 202, which an be an always-on display in one or more embodiments, to present presentation information to a user. The executable software code used by the one or more processors 216 can be configured as one or more modules 220 that are operable with the one or more processors 216. Such modules 220 can store instructions, control algorithms, logic steps, and so forth.

In one embodiment, one or more proximity sensors 208 can be operable with the one or more processors 216. In one embodiment, the one or more proximity sensors 208 include one or more proximity sensor components 240. The proximity sensors 208 can optionally include one or more proximity detector components 241. In one embodiment, the proximity sensor components 240 comprise only signal receivers. By contrast, the proximity detector components 241 include a signal receiver and a corresponding signal transmitter.

While each proximity detector component 241 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 241 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components 241 can have signal receivers that receive similar wavelengths, i.e., about 860 nanometers.

In one or more embodiments the proximity sensor components 240 have a longer detection range than do the proximity detector components 241 due to the fact that the proximity sensor components detect heat directly emanating from a thermal object such as a person's body (as opposed to reflecting off the person's body) while the proximity detector components rely upon reflections of infrared light emitted from the signal transmitter. For example, the proximity sensor component 240 may be able to detect a thermal object such as a person's body via emitted heat from a distance of about ten feet, while the signal receiver of the proximity detector component 241 may only be able to detect reflected signals from the transmitter at a distance of about one to two feet.

In one embodiment, the proximity sensor component 240 comprises an infrared signal receiver so as to be able to detect infrared emissions from a thermal object such as a person or a portion of a person. Accordingly, the proximity sensor component 240 requires no transmitter since objects disposed external to the housing deliver emissions that are received by the infrared receiver. As no transmitter is required, each proximity sensor component 240 can operate at a very low power level. Evaluations conducted show that a group of infrared signal receivers can operate with a total current drain of just a few microamps (approximately 10 microamps per sensor). By contrast, a proximity detector component 241, which includes a signal transmitter, may draw hundreds of microamps to a few milliamps.

In one embodiment, one or more proximity detector components 241, where included, can each include a signal receiver and a corresponding signal transmitter. The signal transmitter can transmit a beam of infrared light that reflects from a nearby object and is received by a corresponding signal receiver. The proximity detector components 241 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 200.

The proximity sensors 208 can be used to transition the various components to sleep or low power modes when a user (101) is not within a thermal detection range of the proximity sensors 208. The proximity sensors 208 can then be used to transition those components to an active mode of operation when a user (101) comes within a thermal detection range. Additionally, in one or more embodiments the proximity sensors 208 can be used to detect when the electronic device 200 is disposed within a pocket or purse, or when it is placed face down, i.e., with the display 202 facing downward, on a flat surface. When this occurs, in one or more embodiments, the one or more processors 216 will not present partial notifications (104) on the display 202 to save energy. However, as soon as the electronic device 200 is turned over, or is touched or interacted with by a user, in one or more embodiments this is detected by the proximity sensors 208. Accordingly, when this occurs the one or more processors 216 can present the predefined information 250, including portions of any notifications that were received.

In one embodiment, the one or more processors 216 may generate commands or execute control operations based on information received from one or more proximity sensors 208. The one or more processors 216 may also generate commands or execute control operations based upon information received from a combination of the one or more proximity sensors 208 and one or more other sensors 209. Alternatively, the one or more processors 216 can generate commands or execute control operations based upon information received from the one or more other sensors 209 alone. Moreover, the one or more processors 216 may process the received information alone or in combination with other data, such as the information stored in the memory 218.

The one or more other sensors 209 may include an audio input in the form of a microphone 260 and an audio output. The audio output can include one or more audio output devices, such as an earpiece speaker 261 and a second loudspeaker (disposed beneath speaker port 232). The one or more other sensors 209 may also include key selection sensors, a touch pad sensor, a touch screen sensor, a capacitive sensor, and one or more switches. Touch sensors may used to indicate whether any of the user actuation targets 206 on present on the display 202 are being actuated. Alternatively, touch sensors in the housing 201 can be used to determine whether the electronic device 200 is being touched at side edges, thus indicating whether certain orientations or movements of the electronic device 200 are being performed by a user. The other sensors 209 can also include surface/housing capacitive sensors, audio sensors, and video sensors (such as a camera).

The other sensors 209 can also include motion detectors 242, such as accelerometers or gyroscopes. For example, an accelerometer may be embedded in the electronic circuitry of the electronic device 200 to show vertical orientation, constant tilt and/or whether the device is stationary. The motion detectors 242 are also operable to detect movement of the electronic device 200 by a user. In one or more embodiments, the other sensors 209 and the motion detectors 242 can each be used as a gesture detection device. Illustrating by example, in one embodiment a user can deliver gesture input by moving a hand or arm in predefined motions in close proximity to the electronic device 200. In another embodiment, the user can deliver gesture input by touching the display 202. In yet another embodiment, a user can deliver gesture input by shaking or otherwise deliberately moving the electronic device 200. Other modes of delivering gesture input will be obvious to those of ordinary skill in the art having the benefit of this disclosure.

Other components operable with the one or more processors 216 can include audio input/output components 243. Examples of output components include audio outputs 244 such as speaker port 232, earpiece speaker 261, or other alarms and/or buzzers and/or a mechanical output component such as vibrating or motion-based mechanisms.

In one embodiment, the electronic device 200 includes a timer 246 that is operable with the one or more processors 216. The timer 246 can be integrated into the one or more processors 216, or can be a standalone device. In one embodiment, the one or more processors 216 are operable to establish a timer duration during which the timer 246 will count. Once the timer 246 has counted through the timer duration, it expires, thereby sending an alert to the one or more processors 216 that the timer duration has lapsed. For example, if a user (101) is required to touch and hold the notification icon 205 for a predetermined duration to hear, discreetly, one or more notifications, the timer 246 can be used for this purpose. The timer 246 could—at the initiation of a user's touch—count through the predetermined duration. At the end of the predetermined duration, which may be one or two seconds, the timer 246 would deliver an alert to the one or more processors 216 that the duration had passed. In such a mode of operation, the timer 246 essentially works as an egg timer in that it is set to a certain time, started, and delivers an alert when the certain time to which it was set expires.

In one embodiment, the one or more processors 216 are operable to change a gain on the microphone 260 such that voice input from a user can be received from different distances. For example, in one embodiment the one or more processors 216 are operable to operate the microphone 260 in a first mode at a first gain sensitivity so that voice commands from a user can be received from more than one foot away from the device. If the electronic device 200 is a smartphone, for instance, the one or more processors 216 may operate the microphone 260 in a first mode at a first gain sensitivity to receive voice input from a user when operating in a speakerphone mode for example. Similarly, when the electronic device 200 is configured with a voice control interface engine 245, the one or more processors 216 may operate the microphone 260 in a first mode at a first gain sensitivity to receive voice input from a user several feet away.

In one embodiment, the one or more processors 216 may further operate the microphone 260 in a second mode at a second gain sensitivity to receive voice input from a user. In one embodiment, the second gain sensitivity is less than the first gain sensitivity. This results in voice input being received from closer distances at lower levels. If the electronic device 200 is a smartphone, for instance, the one or more processors 216 may operate the microphone 260 in a second mode at a second gain sensitivity to receive voice input from a user when the electronic device 200 is placed against the user's face. As the microphone 260 is very close to the user's mouth, this second, lesser gain sensitivity can be used to capture lower volume voice input from the user. Similarly, when the electronic device 200 is configured with a voice control interface engine 245, the one or more processors 216 may operate the microphone 260 in a second mode at a second gain sensitivity to receive voice input from a user's mouth that may be only an inch (or less) from the microphone 260. Not only can this assist in keeping third parties and eavesdroppers from hearing a conversation when operating in the discreet mode of operation, but it can be of assistance in noisy environments since the user is delivering voice commands from a close proximity to the microphone 260.

It is well to note, as a reminder, that as noted above relational terms such as first and second, top and bottom, and the like may be used solely to distinguish one entity or action from another entity or action without necessarily requiring or implying any actual such relationship or order between such entities or actions. Accordingly, the first mode can be considered to be the second mode in other contexts, and vice versa. This point is reiterated here for clarity, as the claims may refer to a first mode that is referred to as the second mode in the specification, and vice versa. The agnostic use of first and second to merely distinguish, without implying a relationship, is used for brevity as describing each in the alternative would easily double the length of the present specification. Those of ordinary skill in the art having the benefit of this disclosure will readily appreciate this fact.

In a similar fashion, the one or more processors 216 can operate the audio output, i.e., one or both of the earpiece speaker 261 and/or the loudspeaker under speaker port 232, in either a first mode or a second mode. In one embodiment, the one or more processors 216 are operable to change a gain of either speaker such that audible output from the electronic device 200 can be heard by a user at different distances. For example, in one embodiment the one or more processors 216 are operable to operate one or both of the earpiece speaker 261 and/or the loudspeaker under speaker port 232 in a first mode at a first gain so that audible output is produced at a first output level. In one embodiment, the first output level is a volume sufficient that the audible output can be heard from more than one foot away from the device.

If the electronic device 200 is a smartphone, for instance, the one or more processors 216 may operate one or both of the earpiece speaker 261 and/or the loudspeaker under speaker port 232 in a first mode at a first gain to produce output at a louder volume when operating in a speakerphone mode for example. Similarly, when the electronic device 200 is configured with a voice control interface engine 245, the one or more processors 216 may operate the one or both of the earpiece speaker 261 and/or the loudspeaker under speaker port 232 in a first mode at a first gain to produce audible output at a first output level so that a user can hear the audible output from a user several feet away.

In one embodiment, the one or more processors 216 may further operate the one or both of the earpiece speaker 261 and/or the loudspeaker under speaker port 232 in a second mode at a second gain to produce audible output at a second output level. In one embodiment, the second gain is less than the first gain such that the second output level is at a lower volume than the first output level. This results in audible output only being audible from closer distances due to the lower output levels. If the electronic device 200 is a smartphone, for instance, the one or more processors 216 may operate the one or both of the earpiece speaker 261 and/or the loudspeaker under speaker port 232 in a second mode at a second gain to deliver audible output to a user when the electronic device 200 is placed against the user's face.

As the earpiece speaker 261 is very close to the user's ear, this second, lesser gain can be used to deliver audible output at a lower level so as not to overdrive the user's eardrums. Similarly, when the electronic device 200 is configured with a voice control interface engine 245, the one or more processors 216 may operate one or both of the earpiece speaker 261 and/or the loudspeaker under speaker port 232 in a second mode at a second gain to deliver audible output to a user's ear when the earpiece speaker 261 is only an inch (or less) from the earpiece speaker 261. In one embodiment, this second mode of operation, i.e., where the second output level is less than the first output level, is known as the "discreet mode" of operation.

In one embodiment, the one or more processors 216 are to switch between the earpiece speaker 261 and the loudspeaker under speaker port 232 when operating in the first mode and the second mode. For example, the earpiece speaker 261 may comprise a small driver to deliver audible output only a few millimeters. By contrast, the loudspeaker under speaker port 232 may be a large driver to deliver audible output across larger distances. Where this is the case, when operating in the first mode the one or more processors 216 may deliver all audio output from speaker port 232. When operating in the second mode, the one or more processors 216 may deliver all audible output from the earpiece speaker 261. Accordingly, in one or more embodiments the electronic device 200 is operative in the second mode to output the audible output from a second loudspeaker, e.g., earpiece speaker 261, that is different from the loudspeaker operable in the first mode, e.g., speaker port 232.

In one embodiment, the output components 243 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio. For example, these devices may be used to filter noise received from the microphone 260. The output components 243 may be a single component as shown in FIG. 2 or may be implemented partly in hardware and partly in software or firmware executed by one or more processors 216. In some embodiments, the output components 243 may be implemented using several hardware components and may also utilize one or more software or firmware components in various combinations. The output components 243 may be operative to control one or both of the earpiece speaker 261 and/or the loudspeaker under speaker port 232, and/or to selectively turn these output devices ON or OFF. Additionally, the output components 243 can adjust filtering or gain of one or both of the earpiece speaker 261 and/or the loudspeaker under speaker port 232 for purposes of various applications described below.

In one or more embodiments, the electronic device 200 includes a voice control interface engine 245. The voice control interface engine 245 can include hardware, executable code, and speech monitor executable code in one embodiment. The voice control interface engine 245 can include, stored in memory 218, basic speech models, trained speech models, or other modules that are used by the voice control interface engine 245 to receive and identify voice commands. In one embodiment, the voice control interface engine 245 can include a voice recognition engine. Regardless of the specific implementation utilized in the various embodiments, the voice control interface engine 245 can access various speech models to identify speech commands.

In one embodiment, the voice control interface engine 245 is configured to implement a voice control feature that allows a user to speak a specific trigger phrase, followed by a command, to cause the one or more processors 216 to execute an operation. For example, the user may say, as a trigger phase, "Okay, Phone, Ready, now Go!" After this, the user may speak a command, such as "How tall is the Sears Tower?" This combination of trigger phrase and command can cause the one or more processors 216 to access an application module 247, such as a web browser, to search for the answer and then deliver the answer as audible output via an output component 243. For example, when operating in the first mode, the one or more processors 216 may deliver the answer as audible output through speaker port 232 at a first output level. When operating in the discreet mode, the one or more processors 216 may deliver the answer as audible output through the earpiece speaker 261 at a second, softer output level. In short, in one embodiment the voice control interface engine 245 listens for voice commands, processes the commands and, in conjunction with the one or more processors 216, returns an audible output that is the result of the user's intent.

In one or more embodiments, the one or more processors 216 are operable to transition the electronic device 200 between the first mode and the second mode, or discreet mode, in response to detecting a predefined user input. In one embodiment, the predefined user input is a gesture input determined by the proximity sensors 208. In another embodiment, the predefined user input is movement of the electronic device 200 as detected by the motion detectors 242 or other sensors 209. In another embodiment, the predefined user input comprises a trigger phrase or unique voice command that causes the transition. In another embodiment, the predefined user input is placing the display 202 of the electronic device 200 against the user's face as determined by the proximity sensors 208. In another embodiment, the predefined user input comprises the proximity sensors 208 being in a covered or uncovered state, which indicates whether the user is holding the electronic device 200 against, for example, their face. In yet another embodiment, the predefined user input is actuation of a user actuation target 206 by a finger or stylus. Of course, combinations of these gestures can be used as described in more detail below to retrieve notification information as audible output from an earpiece speaker 261 in a discrete mode in response to a user (101) touching the display 202 and lifting the electronic device 200 to their ear. Still others will be obvious to those of ordinary skill in the art having the benefit of this disclosure.

In one or more embodiments, the predefined user input comprises a predefined motion of the electronic device 200 by using the motion detectors 242 to determine the spatial orientation of the electronic device 200 in three-dimensional space by detecting a gravitational direction. Similarly, the motion detectors 242 or other sensors 209 can include one or more gyroscopes to detect rotational motion of the electronic device. The gyroscope can be used to determine the spatial rotation of the electronic device in three-dimensional space. Each of these can be used to detect gesture input.

In one or more embodiments the one or more processors 216 are configured to detect not only gesture input, but also a predetermined characteristic of a gesture input. Examples of such characteristics include gesture duration, gesture intensity, gesture proximity, gesture accuracy, gesture contact force, or combinations thereof. Where the one or more processors 216 detect such a predetermined characteristic, it can be used to toggle the electronic device 200 between a first mode of operation and a second mode of operation.

In one embodiment, the one or more processors 216 are operable to present one or more user actuation targets 206 at a location on the display 202. The user actuation target 206 can be the notification icon 205, a partial notification (104), or other type of user actuation target 206. The one or more processors 216 are then operable to detect an object, such as a user's finger, proximately located with the display at the location where the user actuation target 206 is presented. In one embodiment, the one or more processors 216 are further operable to detect a lifting gesture, with the motion detectors 242 or other sensors 209, lifting the electronic device 200 from a first elevation to a second elevation that is greater than the first elevation.

When detection of this sequence—touching a user actuation target 206 and lifting the electronic device 200—occurs, in one embodiment the one or more processors 216 are operable to transition the electronic device 200 to a second mode of operation, which is the discreet mode in one embodiment. When operating in the discreet mode, the electronic device 200 is operable to produce, in response to touched user actuation targets 206 or partial notifications (104), the entirety of a notification as audible output at a second output level that is less than the first output level. In one embodiment, this includes redirecting the audible output to an earpiece loudspeaker 261 of the electronic device 200. Accordingly, these softer output commands are delivered to the user (101) through the earpiece speaker 261 when operating in the discreet mode of operation. Advantageously, by touching a user actuation target 206—or alternatively touching and holding the user actuation target 206—and lifting the electronic device 200, the electronic device 200 can transition from the first mode to the discreet mode. The user (101) can then hear the entirety of a notification without third parties or eavesdroppers hearing the information delivered in the form of audible output.

Other functions can occur in the electronic device 200 as well. In one embodiment, instead of touching a user actuation target 206 and lifting the electronic device 200 to hear notification details, a user (101) is required to touch and hold the user actuation target 206. Accordingly, in another embodiment the one or more processors 216 are operable to first determine the object is proximately located with touch-sensitive display at the predefined location of the user actuation target 206 for at least a predetermined duration. The one or more processors 216 can then cause the audio output of the electronic device 200 to operate in the discreet mode only after the predetermined duration and detecting the lifting gesture.

Additionally, the one or more processors 216, operating in conjunction with the proximity sensors 208 and the other sensors 209, can transition the electronic device 200 back to the normal mode of operation. Illustrating by example, in one embodiment the one or more processors 216 can detect, with the motion sensor, a lowering gesture lowering the electronic device 200 from the second elevation back to the first elevation. Where this occurs, the one or more processors 216 can cause the audio output to return to the normal mode of operation.

In another embodiment, the one or more processors 216 can monitor the proximity sensors 208 of the electronic device 200 to detect another object, such as the user's head or ear, being proximately located with a housing 201 of the electronic device 200 while delivering notification details in the discreet mode. The one or more processors 216 can then detect, with the proximity sensors 208, removal of the other object from the housing 201 of the electronic device 200. Upon detecting removal of the other object, the one or more processors 216 can cause the electronic device 200 to return to the normal mode of operation.

It is to be understood that the electronic device 200 and the architecture of FIG. 2 is provided for illustrative purposes only and for illustrating components of one electronic device 200 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
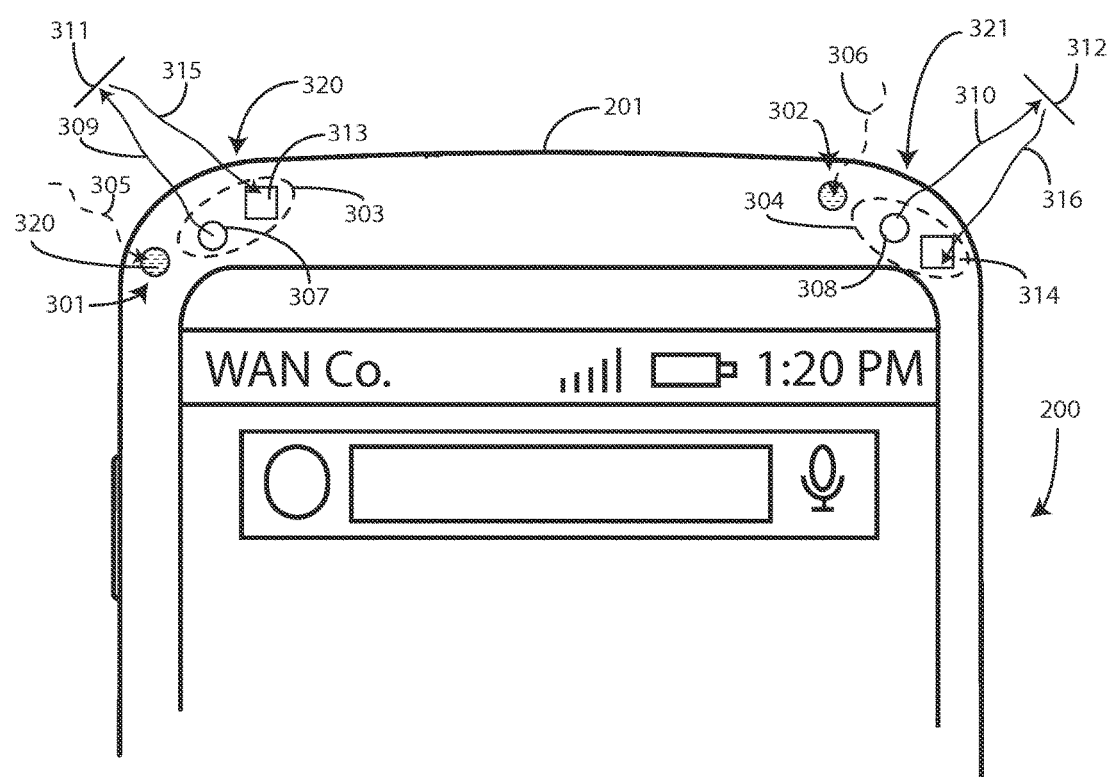
FIG. 3 illustrates explanatory proximity sensors in accordance with one or more embodiments of the disclosure.

Turning now to FIG. 3, illustrated therein is the difference between proximity sensor components 301,302 and proximity detector components 303,304 as those terms are used herein. Illustrated therein are two proximity sensor components 301,302 and two proximity detector components 303, 304, each disposed at different locations 320,321, each of which happens to be a corner of the electronic device 200 in this illustrative embodiment. In this embodiment, each proximity sensor component 301,302 comprises a signal receiver 313 only, such as an infrared photodiode to detect an infrared emission 305,306 from an object external to the housing 201 of the electronic device 200. No corresponding transmitter is included or required for the proximity sensor component 301,302 to function. As no active transmitter emitting signals is included, each proximity sensor component 301,302 is sometimes referred to as a "passive IR" proximity sensor. As the proximity sensor components 301, 302 receive thermal emissions from an object, in one or more embodiments they can be used as temperature sensors.

By contrast, each proximity detector component 303,304 can be an infrared proximity sensor set that uses a signal emitter 307,308 that transmits a beam 309,310 of infrared light that reflects 311,312 from a nearby object and is received by a corresponding signal receiver 313,314. Proximity detector components 303,304 can be used, for example, to compute the distance to any nearby object from characteristics associated with the reflected signals 315,316. The reflected signals 315,316 are detected by the corresponding signal receiver 313,314, which may be an infrared photodiode used to detect reflected light emitting diode (LED) light, respond to modulated infrared signals, and/or perform triangulation of received infrared signals. Accordingly, the proximity detector components 303,304 can be used to determine of the electronic device 200 is covered by clothing in one or more embodiments.

In one embodiment, the proximity sensor components 301,302 and the proximity detector components 303,304 can include at least two sets of components. For example, a first set of components can be disposed at a location 320 on the electronic device 200, while another set of components can be disposed at a second location 321 on the electronic device 200.

Figure 4:
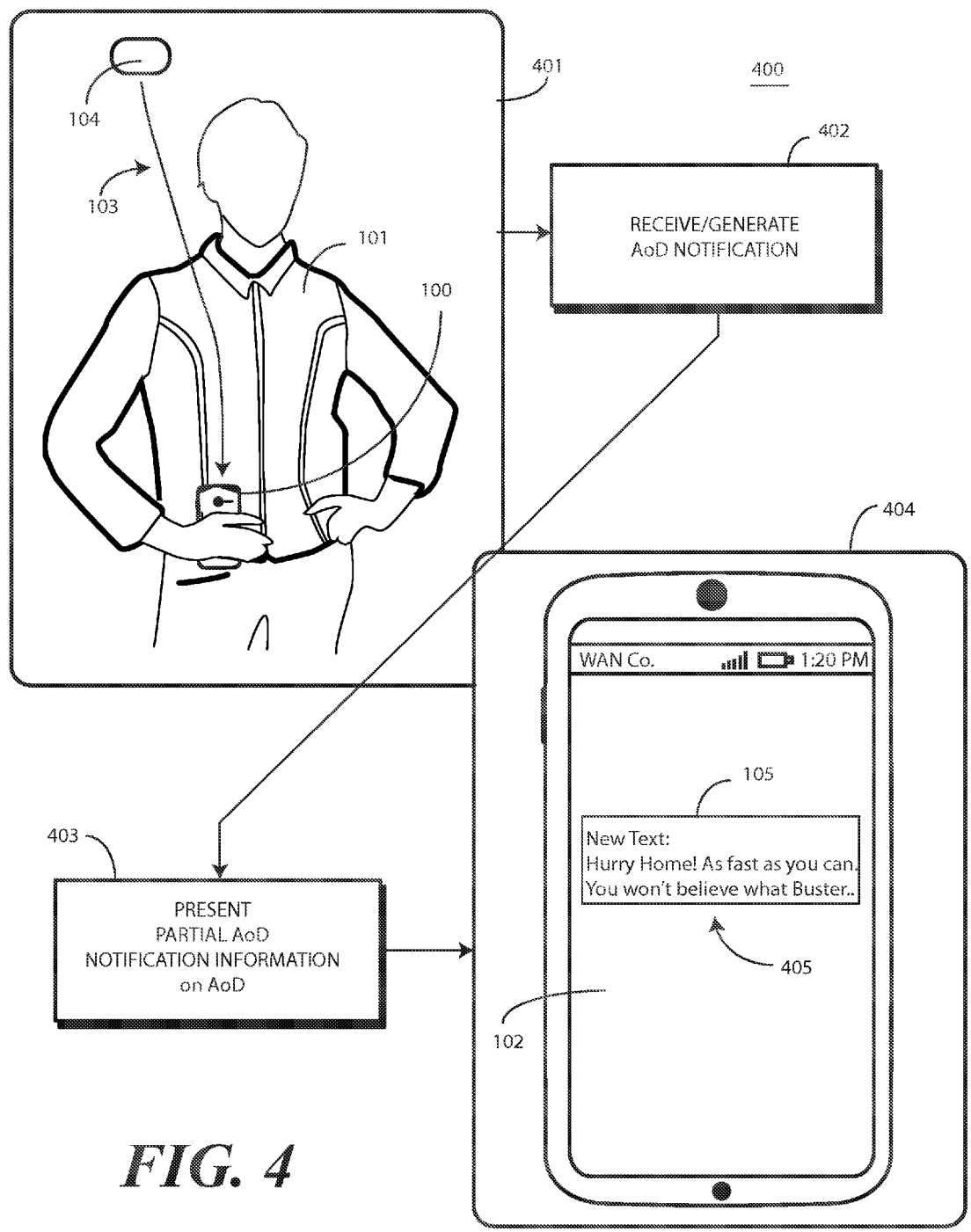
FIG. 4 illustrates one or more explanatory method steps in accordance with one or more embodiments of the disclosure.

Turning now to FIG. 4, illustrated therein is a method 400 of using an electronic device 100 in accordance with one or more embodiments of the disclosure. At step 401, a user 101 is shown holding the electronic device 100. At step 402, the electronic device 100 receives 103 a notification 104 from a remote electronic device. Here, the notification 104 is in the form of a text message received from a network. Other examples of notifications include electronic mail, multimedia messages, social networking activities and updates, newsfeed streams, application notifications, system notifications, and so forth. Still other examples of notifications will be obvious to those of ordinary skill in the art having the benefit of this disclosure.

At step 403, the method 400 presents a portion 105 of the notification 104 on a display 102. In one embodiment, the portion 105 of the notification 104 is presented at a predefined location 405 of the display 102. The presentation of the portion 105 of the notification 104 is shown at step 404.

Figure 5:
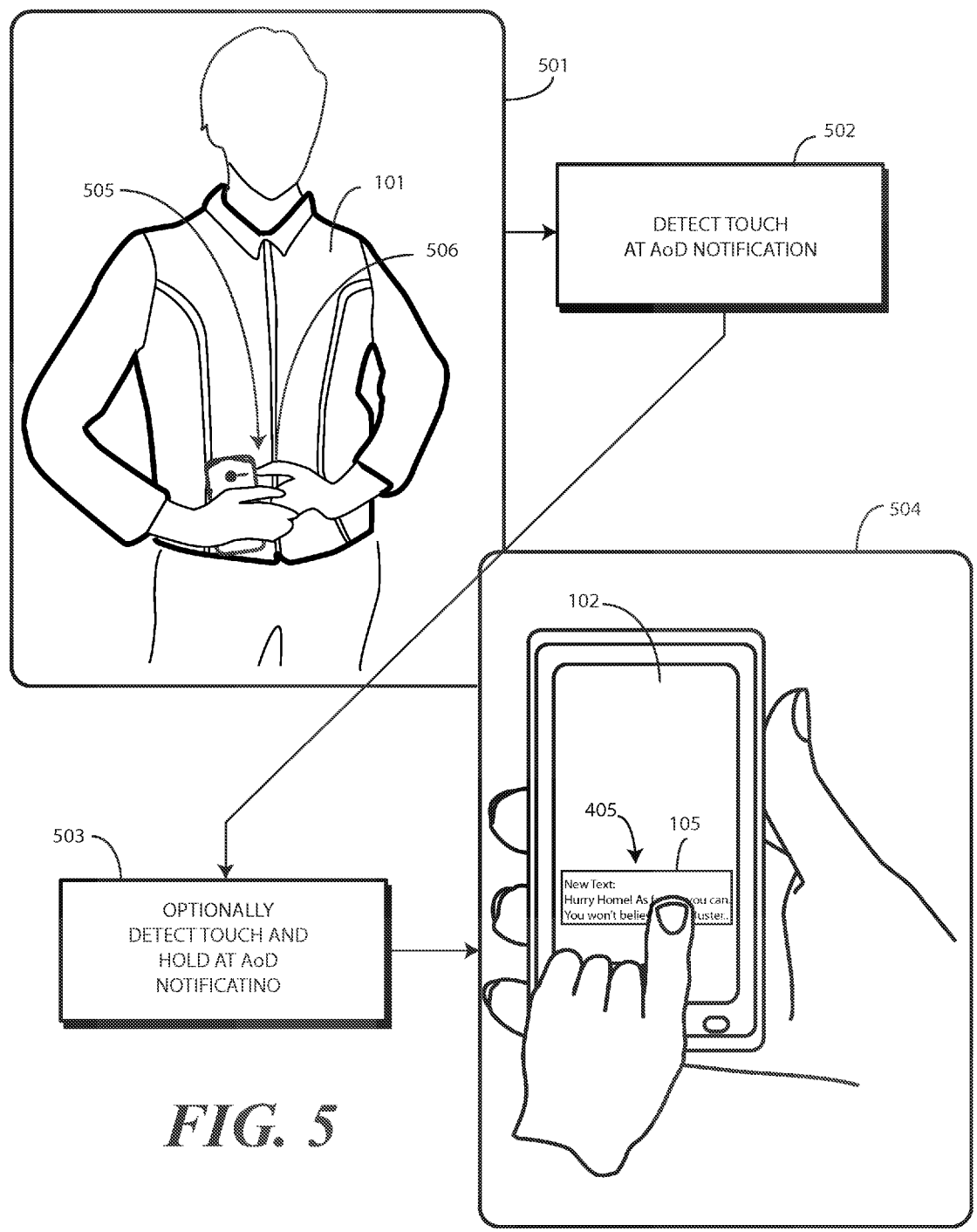
FIG. 5 illustrates one or more explanatory method steps in accordance with one or more embodiments of the disclosure.

Turning now to FIG. 5, at step 501 the user 101 touches 505 the display 102 at the predefined location 405. In this illustrative embodiment, the user 101 touches the portion 105 of the notification (104). This touching is shown at step 504. At step 502 the method 400 detects an object 506, in this case the user's finger, being proximately located with the display 102 at the predefined location 405.

In one or more embodiments, to prevent accidental readout of the notification (104), the method 400 can require that the user 101 touch and hold the relevant user actuation target, in this case the portion 105 of the notification (104) for at least a predetermined duration. This ensures that the user 101 is intentionally touching the user actuation target, as opposed to merely accidentally brushing a finger or other object across the display. Where this additional false trip protection is included, optional step 503 can include determining that the object 506 is proximately located with touch-sensitive display at the predefined location 405 corresponding to where the portion 105 of the notification (104) is presented for at least a predetermined duration, such as one, two, or three seconds.

Figure 6:
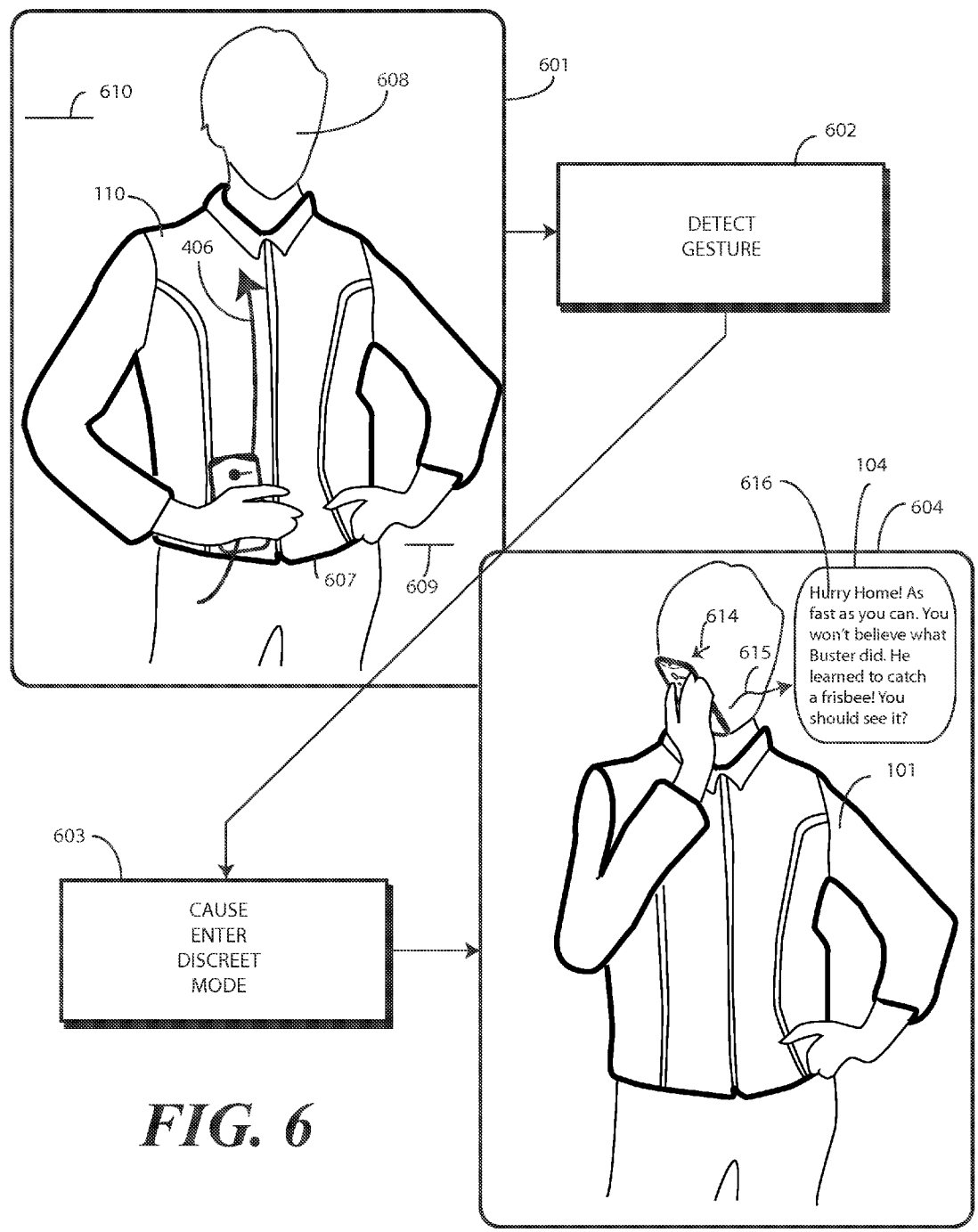
FIG. 6 illustrates one or more explanatory method steps in accordance with one or more embodiments of the disclosure.

Turning now to FIG. 6, after touching the relevant user actuation target, the user 101 is interested in hearing the entirety of the notification 104. Additionally, the user 101 may not want third parties to hear the same. Accordingly, at step 601 the user 101 delivers a predefined user input by executes executing a lifting gesture 406, which in this example occurs by lifting the electronic device 100 from her waist 607 to her head 608. Accordingly, the lifting gesture 406 of this explanatory step 601 comprises lifting the electronic device 100 from a first elevation 609 to a second elevation 610, where the second elevation 610 is greater than the first elevation 609. In one embodiment, this lifting gesture comprises movement of the electronic device 100 from a first position distally located from the user 101 to a second position proximately located with the user 101, and more particularly, proximately located with the user's head.

At step 602, one or more processors of the electronic device 100 detect the lifting gesture 606 lifting the electronic device from the first elevation 609 to the second elevation 610. At step 603, the one or more processors cause the electronic device 100 to transition to a second mode. As shown at step 604, in the second mode the audio output of the electronic device operates in a discreet mode to produce audible output 614 at a second output level that is less than a first output level when the electronic device 100 operates in a normal mode.

At step 604 the electronic device 100 delivers, with an audio output device, the entirety of the content 616 of the notification 104 as audible output. Continuing from the example of FIG. 1, the entirety of the content 616 states, "Hurry Home! As fast as you can. You won't believe what Buster did. He learned to catch a Frisbee! You should see it." Thus, while the user 101 could infer many different things from the portion (105) of the notification 104 presented on the display 102, by touching the notification and lifting the electronic device 100, the user 101 hears the entirety of the content 616 and is able to determine that no emergency is occurring. Thus, if convenient, she can run home and watch Buster fetch. Otherwise, she may be able to catch up with Buster's shenanigans at a later time.

Using the method steps of FIGS. 4-6, when a portion 105 of a notification 104 is presented on a display 102, when the user 101 touches the portion 105 of the notification 104, or alternatively a user actuation target or other icon, and raises the electronic device 100 to their ear, the electronic device 100 will read the entirety of the content 616 of the notification, i.e., the notification details, discreetly through the earpiece speaker (261) with no voice command required. In one or more embodiments, as noted at step 503, this discreet delivery can be initiated by instead touching and holding the portion 105 of the notification 104 to prevent false tripping of the feature and raising the electronic device 100 to their ear. Other initiation sequences will be obvious to those of ordinary skill in the art having the benefit of this disclosure.

Figure 9:
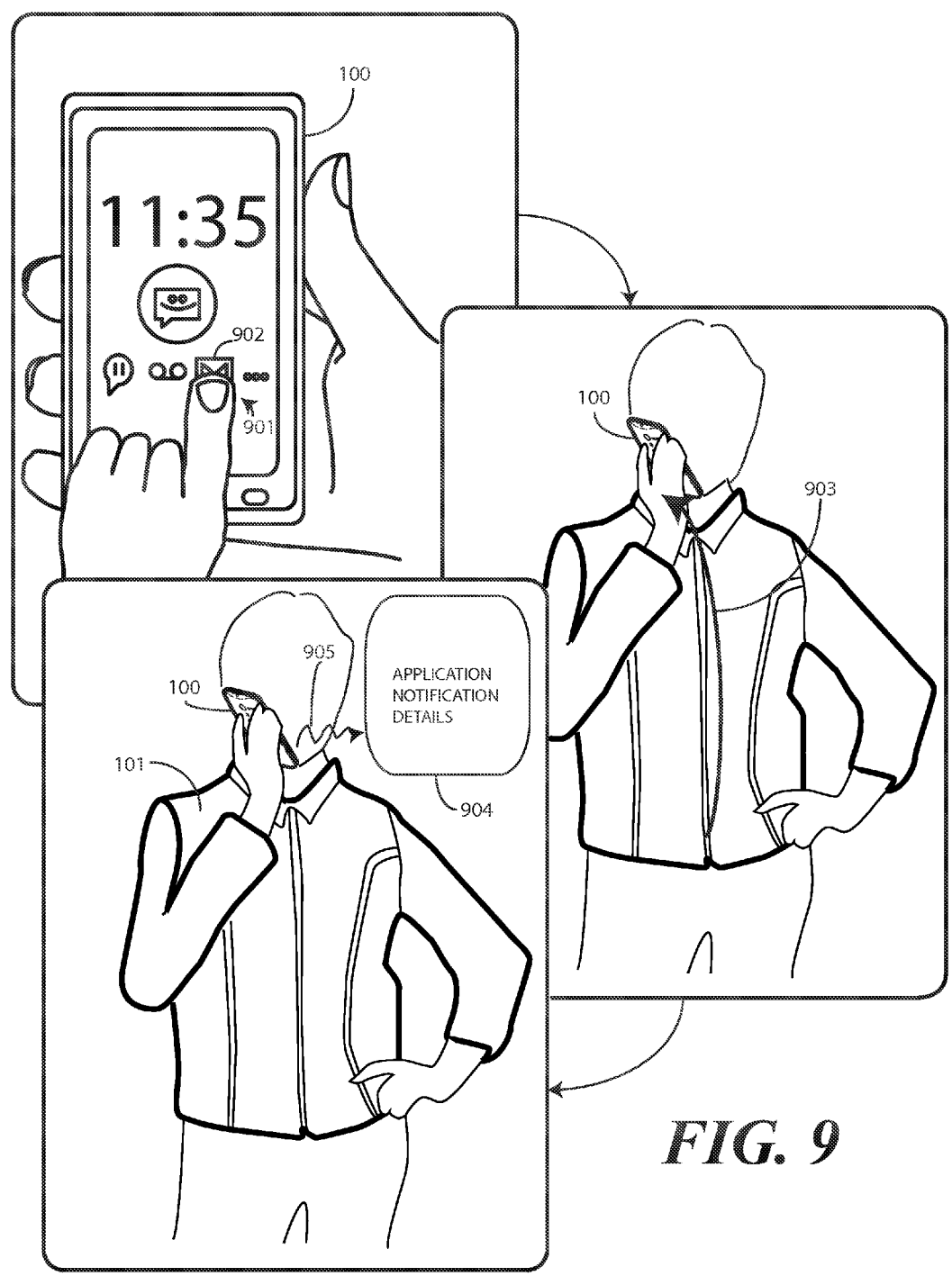
FIG. 9 illustrates another explanatory method in accordance with one or more embodiments of the disclosure.
Figure 10:
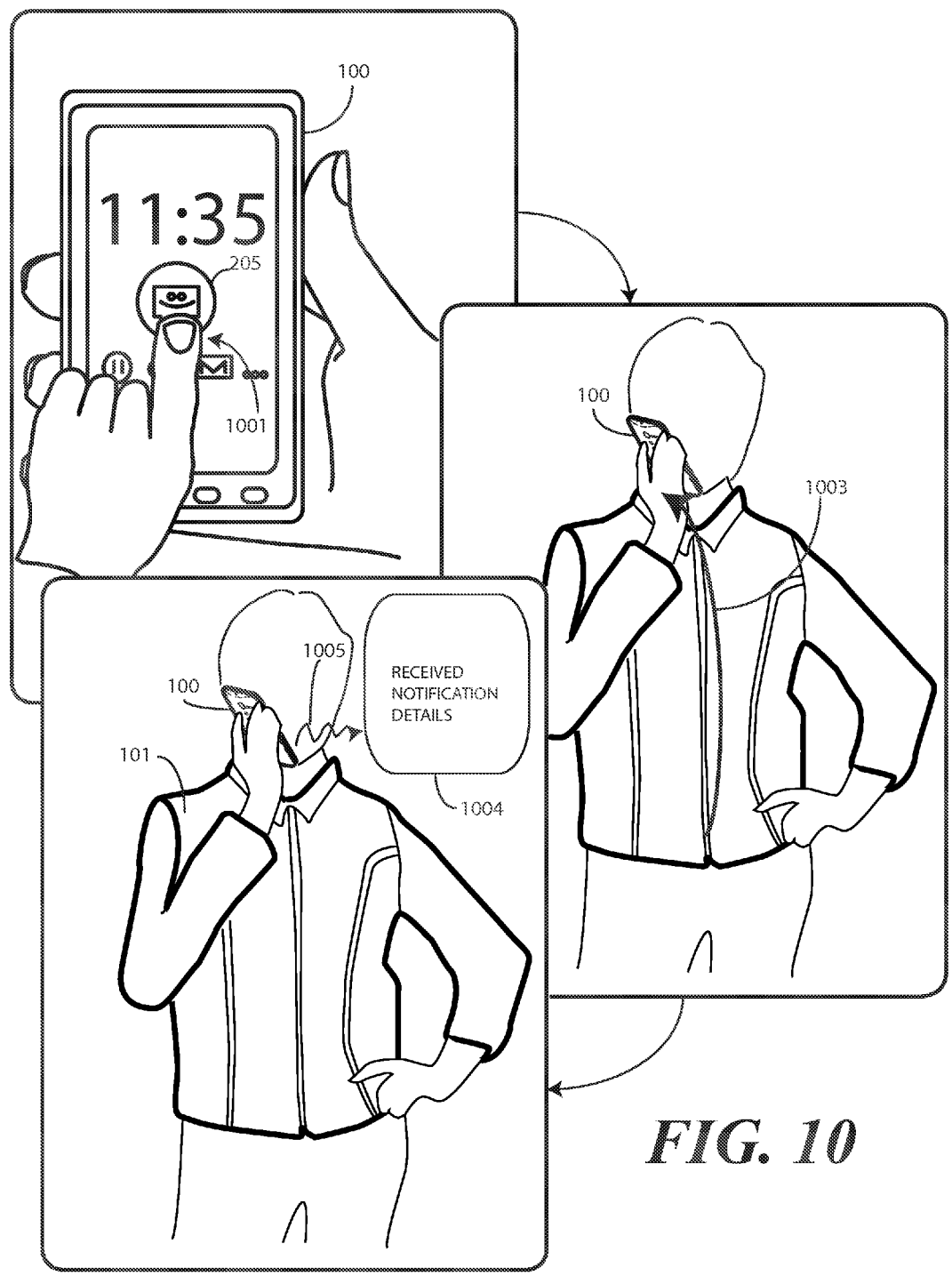
FIG. 10 illustrates another explanatory method in accordance with one or more embodiments of the disclosure.
Figure 11:
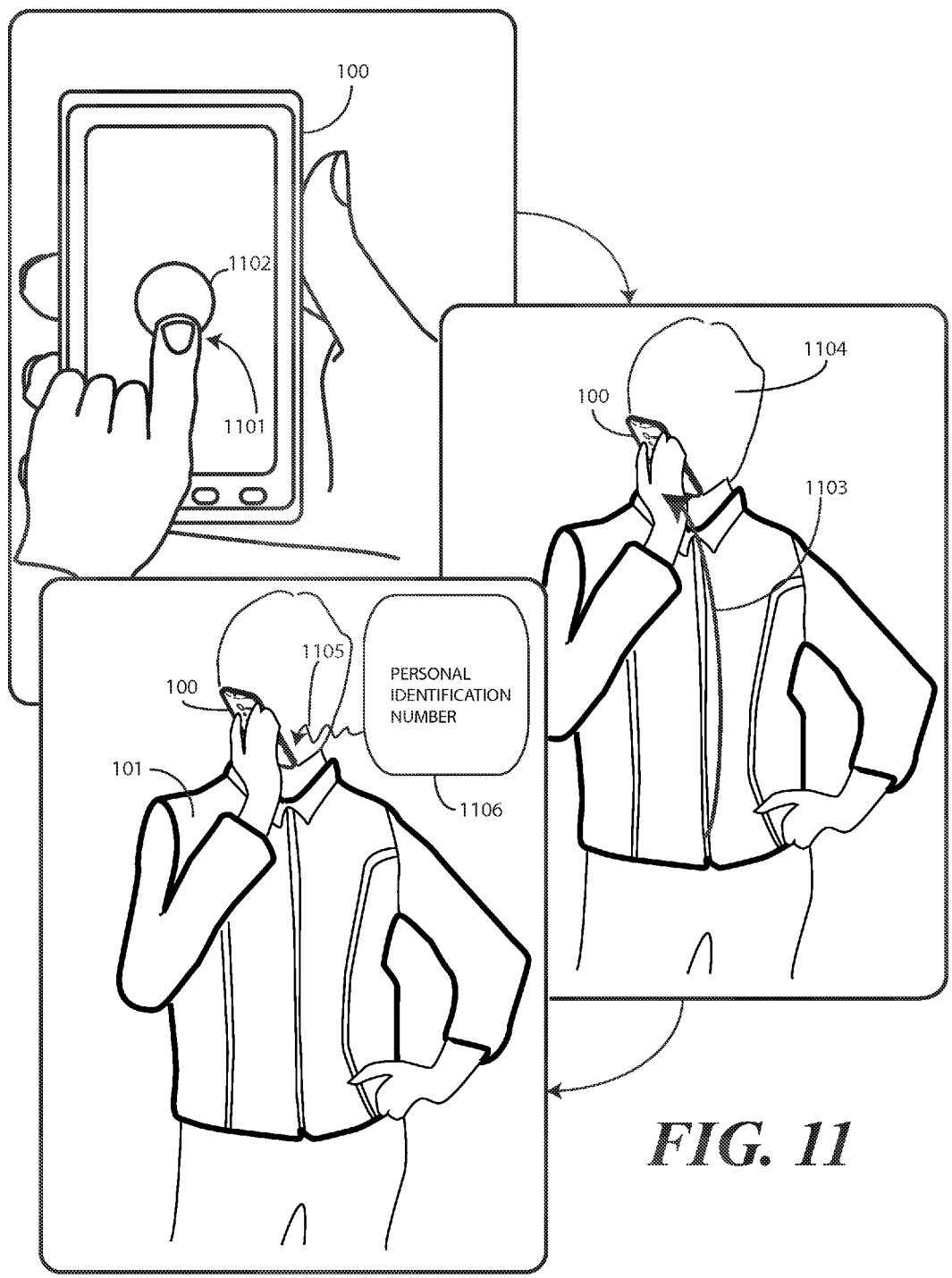
FIG. 11 illustrates another explanatory method in accordance with one or more embodiments of the disclosure.

Once the touch and lift gesture sequence is detected, it can be used to allow a user to obtain information from a variety of sources operating in the electronic device 100. A few of these are illustrated in FIGS. 9-11. For example, as shown in FIG. 9, if the user 101 touches 901 a specific user actuation target 902 corresponding to an application, and then lifts 903 the electronic device 100 to their ear, notification details 904 from the application can be read 905 to the user 101 while the electronic device 100 is operating in the discreet mode.

As shown at FIG. 10, if the display 102 is an always-on display presenting an predefined amount of information 250, and the user 101 touches 1001 and holds a notification icon 205, and then lifts 1003 the electronic device 100 to their ear, notification details 1004 from any received notifications will be read 1005 to the user 101 while the electronic device 100 is operating in the discreet mode. As shown in FIG. 11, if the user 101 touches 1101 a specific user actuation target 1102 used to unlock the electronic device 100, the user 101 can then lift 1103 the electronic device 100 to their head 1104 to speak 1105 their personal identification number 1106 discreetly into the microphone to unlock the electronic device 100. Other applications for embodiments of the disclosure will be obvious to those of ordinary skill in the art having the benefit of this disclosure.

While touching a user actuation target and lifting the device is one way to hear notification details, embodiments of the disclosure are not so limited. In another embodiment, a user can deliver a different predefined user input that is not movement of the electronic device 100 from one elevation (609) to another elevation (610). Instead, in another embodiment the predefined user input used to transition the electronic device 100 to the discreet mode is detected by the proximity sensors (208). For example, in another embodiment, the proximity sensors (208) can detect that the electronic device 100 is proximately located with the user's head 1104. When this occurs, the one or more processors can cause the electronic device 100 to transition to the discrete mode to deliver notification details as audible output at a second output level as previously described. Of course, combinations of user inputs can be used as well. For instance, in another embodiment the predefined user input can be a combination of detecting a predefined gesture and, with the proximity sensors (208) detecting that the electronic device is proximately located with the user's head 1104. Other predefined user input 406 will be obvious to those of ordinary skill in the art having the benefit of this disclosure.

Figure 7:
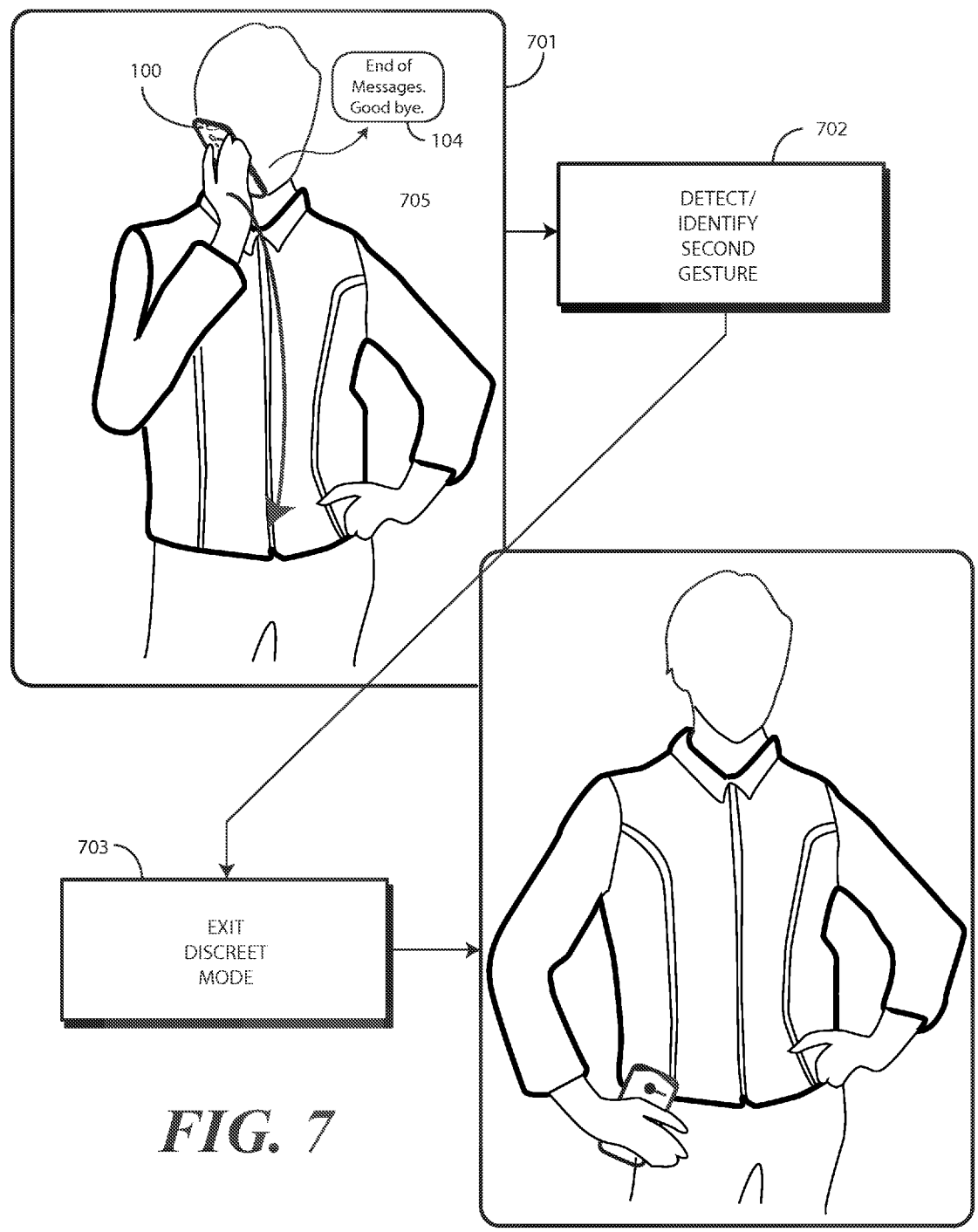
FIG. 7 illustrates one or more explanatory method steps in accordance with one or more embodiments of the disclosure.

Embodiments of the disclosure contemplate that once the electronic device 100 is in the second mode, it can be desirable to transition the electronic device 100 back into the first mode of operation. There are a variety of ways to accomplish this. Turning now to FIG. 7, illustrated therein is one such technique for returning the electronic device 100 to the normal mode of operation.

At step 701, the electronic device 100 is operating in the second mode, where notifications 104 at a second, softer output level. In this example, the end of the notification 104 is identified.

The user 101 is now done with the discreet mode of operation. Accordingly, in one embodiment, the user 101 can return the electronic device 100 to the first mode of operation when a predefined condition is identified. In FIG. 7, the predefined condition is a reverse motion 705 of the electronic device 100, which can be identified by proximity sensors and/or other sensors at step 702. When this occurs, in one embodiment at step 703 one or more processors of the electronic device 100 are operable to return the electronic device 100 to the first mode of operation. Other examples of predefined user input to transition the electronic device 100 into, and out of, the discrete mode to deliver notification details will be obvious to those of ordinary skill in the art having the benefit of this disclosure.

Embodiments of the disclosure contemplate that in some cases the user 101 will not make any affirmative action, e.g., gesture, touch, voice command, and so forth, to cause the electronic device 100 to return to the first mode of operation. In one or more embodiments, these additional methods involve the use of the proximity sensors (208) to provide a quick and automatic method for causing the electronic device 100 to transition between the first mode and the second mode of operation.

In one or more embodiments, after the notification details are completely read, when the proximity sensors (208) indicate that no object is proximately located with the electronic device 100, the one or more processors can cause the voice control interface engine (245) to switch back to the first mode of operation. Said differently, in another embodiment the one or more processors of the electronic device 100 can monitor one or more proximity sensors (208) to detect another object, i.e., the user's head (1104) proximately located with a housing of the electronic device during the delivering of the notification details. The processors can then detect removal of the other object from the housing of the electronic device after the notification details are complete and, upon detecting removal of the object can cause the electronic device to return to the normal mode of operation. However, in one embodiment if the object is detected by the proximity sensors (208), the one or more processors will cause the electronic device 100 to remain in the second mode of operation, i.e., the discreet mode.

Figure 8:
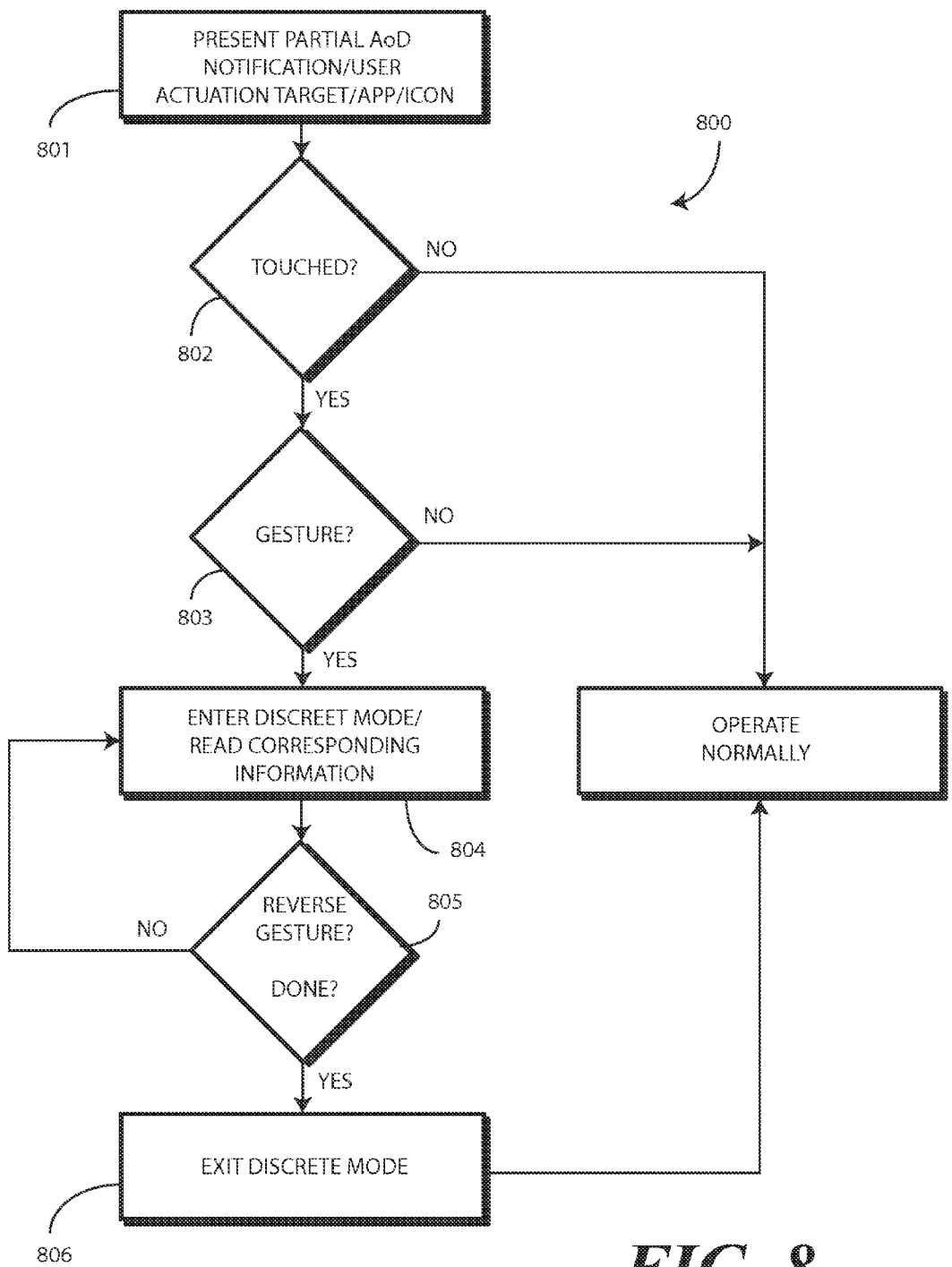
FIG. 8 illustrates another explanatory method in accordance with one or more embodiments of the disclosure.

Turning now to FIG. 8, illustrated therein is a general method 800 in accordance with one or more embodiments of the disclosure. At step 801, in one embodiment the method 800 presents, with one or more processors of an electronic device, a portion of a notification on a touch sensitive display. In some embodiments, instead of a portion of a notification, at step 801 the one or more processors present a different user actuation target at a predefined location of the display of the electronic device. The predefined user actuation target can include a notification icon, an application icon, a device unlock icon, or other type of icon.

At decision 802, the method 800 can determine whether an object, such as a user's finger or stylus, is proximately located with touch-sensitive display at a location corresponding to where the portion of the notification, or alternatively the user actuation target, is presented. At decision 803, the method 800 can determine whether a gesture occurs. In one embodiment, the gesture is a lifting gesture lifting the electronic device from a first elevation. In one embodiment, the lifting gesture comprises movement of the electronic device from a first position distally located from a user to a second position proximately located with the user. In one embodiment, the second position is proximately located with a user's head.

In one embodiment, where a portion of a notification or user actuation target, presented at step 801, is touched as determined at decision 802, and the electronic device is lifted as determined at decision 803, at step 804 the method 800 can cause the electronic device to operate in a discreet mode operative to produce audible output at a second output level that is less than a first output level when the electronic device operates in a normal mode of operation. At step 804, the method 800 can also deliver, with an audio output device, content of the notification or corresponding to the user actuation target as the audible output while operating in the discreet mode. In one embodiment, step 804 includes redirecting the audible output to an earpiece loudspeaker of the electronic device.

Where the object presented at step 801 was an application icon, in one embodiment the audible output of step 804 will comprise notification information generated by an application corresponding to the application icon. By contrast, where the object presented at step 801 is a portion of a notification, the audible output of step 804 will comprise an entirety of the notification.

In one embodiment, where the object presented at step 801 was a device unlock icon, step 804 can also include receiving, with an audio input device, an audio input. In one embodiment, the audio input comprises a personal identification number as described above with reference to FIG. 11. Accordingly, in one embodiment step 804 can include, in response to the receiving the audio input, transitioning the electronic device from a locked mode of operation to a user accessible mode of operation.

At decision 805, the method 800 can determine whether the user wishes to return the electronic device to a normal mode of operation. In one embodiment, the method 800 monitors, at step 804, another object such as the user's head being proximately located with a housing of the electronic device during the delivery of the notification as audible output. Where this is the case, decision 805 determines whether the other object has been removed from a housing of the electronic device. Upon detecting this removal, in one embodiment at step 806 the method 800 causes electronic device to return to the normal mode of operation.

In another embodiment, decision 805 determines whether a lowering gesture lowering the electronic device from the second elevation to the first elevation occurs. Where this occurs, in one embodiment at step 806 the method 800 causes electronic device to return to the normal mode of operation.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, comprising:
presenting, with one or more processors of an electronic device, a portion of a notification on a touch-sensitive display;
detecting, with the one or more processors:
an object proximately located with the touch-sensitive display at a location corresponding to where the portion of the notification is presented; and
a lifting gesture lifting the electronic device from a first elevation to a second elevation, the second elevation greater than the first elevation; and
in response to the detecting:
causing, with the one or more processors, the electronic device to operate in a discreet mode operative to produce audible output at a second output level that is less than a first output level when the electronic device operates in a normal mode; and delivering, with an audio output device, content of the notification as the audible output.

2. The method of claim 1, further comprising redirecting the audible output to an earpiece loudspeaker of the electronic device.

3. The method of claim 1, the lifting gesture comprising movement of the electronic device from a first position distally located from a user to a second position proximately located with the user.

4. The method of claim 3, the second position proximately located with a user's head.

5. The method of claim 1, further comprising:
monitoring, with the one or more processors, one or more proximity sensors of the electronic device to detect another object proximately located with the electronic device during the delivering;
detecting, by the one or more processors from the one or more proximity sensors, removal of the another object from the electronic device; and
upon detecting removal of the object causing, with the one or more processors, the electronic device to return to the normal mode.

6. The method of claim 1, further comprising:
detecting a lowering gesture lowering the electronic device from the second elevation to the first elevation; and
causing, with the one or more processors, the electronic device to transition to the normal mode in response to the lowering gesture.

7. The method of claim 1, the detecting further comprising determining the object is proximately located with the touch-sensitive display at the location corresponding to where the portion of the notification is presented for at least a predetermined duration prior to the causing.

8. The method of claim 1, the notification comprising an electronic message received from a remote electronic device.

9. An apparatus, comprising:
one or more processors;
a touch-sensitive display operable with the one or more processors;
an audio output, operable with the one or more processors, and operative in a first mode to produce an audible output at a first output level;
the one or more processors to:
present a user actuation target at a location on the touch-sensitive display; and
detecting:
an object proximately located with the touch-sensitive display at the location; and
a lifting gesture lifting an electronic device from a first elevation to a second elevation that is greater than the first elevation; and
in response to the detecting:
cause the audio output to operate in a discreet mode operative to produce the audible output at a second output level that is less than the first output level; and deliver content corresponding to the user actuation target as the audible output from an audio output device.

10. The apparatus of claim 9, the audio output device comprising an earpiece loudspeaker.

11. The apparatus of claim 9, the user actuation target comprising an application icon.

12. The apparatus of claim 11, the content comprising notification information generated by an application corresponding to the application icon.

13. The apparatus of claim 9, the user actuation target comprising a portion of a notification.

14. The apparatus of claim 13, the content comprising an entirety of the notification.

15. The apparatus of claim 9, the one or more processors further operable to:
determine the object is proximately located with the touch-sensitive display at the location for at least a predetermined duration; and
cause the audio output of the electronic device to operate in the discreet mode only after the predetermined duration.

16. The apparatus of claim 9, the one or more processors further operable to:
detect a lowering gesture lowering the electronic device from the second elevation to the first elevation; and
cause the audio output to return to a normal mode of operation.

17. A method, comprising:
presenting, with one or more processors of an electronic device, a user actuation target at a location along a touch-sensitive display;
detecting, with the one or more processors:
an object proximately located with the touch-sensitive display at the location; and
a lifting gesture lifting the electronic device from a first elevation to a second elevation, the second elevation greater than the first elevation; and
in response to the detecting:
causing, with the one or more processors, an audio output of the electronic device to operate in a discreet mode operative to produce audible output at a second output level that is less than a first output level when the electronic device operates in a normal mode;
receiving, with an audio input device, an audio input; and
in response to the receiving the audio input, transitioning the electronic device from a locked mode of operation to a user accessible mode of operation.

18. The method of claim 17, the user actuation target comprising a device unlock icon.

19. The method of claim 18, the audio input comprising a personal identification number.

20. The method of claim 17, the detecting further comprising determining the object is proximately located with the touch-sensitive display at the location for at least a predetermined duration, the transitioning occurring only after the predetermined duration.

* * * * *